United States Patent

Neefe

[15] 3,641,717
[45] Feb. 15, 1972

[54] METHOD FOR MAKING ASPHERIC CONVEX SURFACES
[72] Inventor: Charles W. Neefe, Box 361, Big Spring, Tex. 79720
[22] Filed: Feb. 27, 1970
[21] Appl. No.: 15,120

Related U.S. Application Data

[63] Continuation-in-part of Ser. No. 643,250, June 2, 1967, Pat. No. 3,510,207.
[52] U.S. Cl. ............................................. 51/284, 51/131
[51] Int. Cl. ............................................... B24b 1/00
[58] Field of Search ............... 51/124 L, 131, 216 A, 216 LP, 51/284

[56] References Cited

UNITED STATES PATENTS

| 3,471,976 | 10/1969 | Barnett | 51/284 |
| 3,491,489 | 1/1970 | Rudd | 51/284 |
| 3,535,825 | 10/1970 | Volk | 51/284 X |

*Primary Examiner*—Donald G. Kelly
*Attorney*—Richards, Harris & Hubbard

[57] ABSTRACT

A method of generating aspheric convex surfaces by abrading a spherical rotating surface against a flat rotating surface. The rotating axis of the convex surface is inclined in relation to the rotating axis of the flat surface and abrades the convex surface near the edge to provide an aspheric surface having a larger radius of curvature at the periphery.

5 Claims, 1 Drawing Figure

PATENTED FEB 15 1972 3,641,717
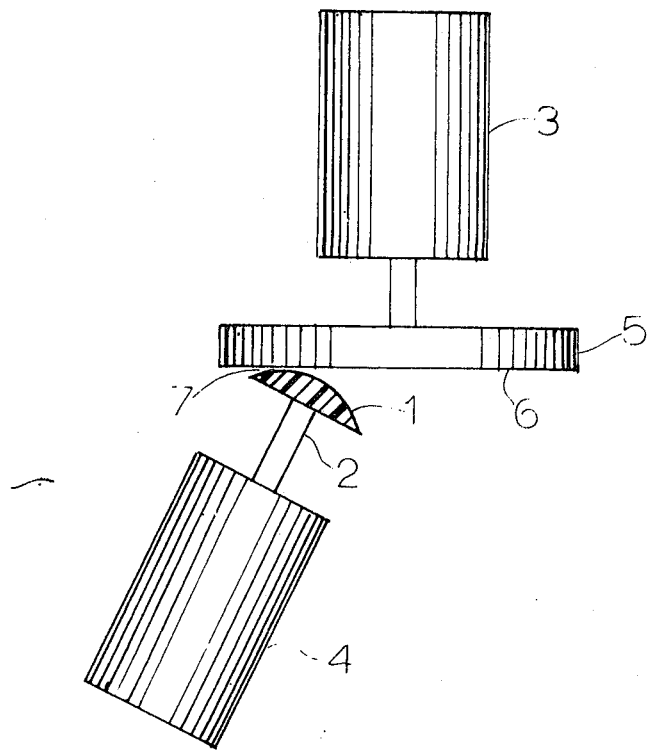
Charles W. Neefe

METHOD FOR MAKING ASPHERIC CONVEX SURFACES

This is a continuation-in-part of U.S. Pat. application Ser. No. 643,250, filed June 2, 1967, now U.S. Pat. No. 3,510,207 issued on May 5, 1970, to Charles W. Neefe for "A Method and Apparatus for Measuring Spherical Aberration of the Eye."

Aspheric surfaces have many desirable uses in all types of optical lenses. Their extensive uses has been limited by the difficulty in producing them in quantity and economically. The object of the present invention is to provide a reliable and economical method of producing large numbers of quality aspheric surfaces. A sphere is a poor refracting surface due to spherical aberration. Spherical aberration is the inability of all parts of a spherical surface to bring parallel light rays to a point focus. The periphery of a spherical refracting surface has a shorter focal length than the central area. This condition worsens rapidly with the increase of the aperture. Spherical aberration increases by the square of the aperture. This rapid increase limits the effective use of many larger aperture lenses. Coma and astigmatism of oblique incidents are two off axis manifestations of spherical aberration. If the paths of parallel light are traced through many zones of a large aperture spherical surface, each zone will be found to have a different focal length. If these rays are plotted, a geometric figure, the caustic, will result having no point focus. A zone may be found within the caustic where the rays come closest together. This zone is called the circle of least confusion, and will be located nearer the lens than the focus of the central rays. If the periphery of the convex lens surface is gradually flattened in precisely the correct degree and place, the caustic may be eliminated and a point focus will result. It has been found that a spherical surface may be changed into such a surface if the area near the edge is flattened slightly. The point of greatest departure from a sphere will be located 71 percent of the distance from the center to the edge. The degree of flattening at the 71-percent point depends upon the diameter of the lens, the radius of curvature, and the refractive index of the lens material. The following formula may be employed to arrive at the maximum depth of the correction required for crown glass planoconvex lenses: $x=0.0123 D/R^3$.

$x$ is the departure from a true sphere.
$D$ is the diameter of the lens.
$R$ is the focal aperture.

The correction at any given distance from the center of the lens may be found by the following formula: $xy=A/4F^3 (N/N-1 h^2 y^2 - y^4)$.

$y$ is the distance from center of lens.
$A$ is the aberration coefficient (1.08 for crown glass).
$h$ is the radius of the lens.
$F$ is the focal length.
$N$ is the refractive index (1.52 for crown glass).

The following graph is a typical example of the above solution:

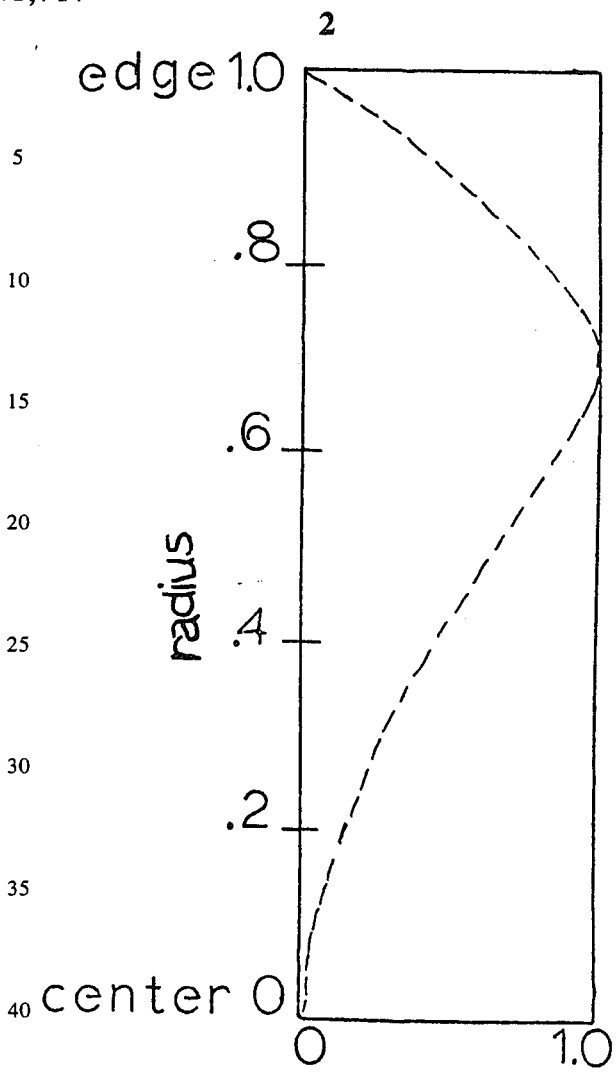

To accomplish the correction, we employ a rotating tool which may be flat, concave, or convex in form depending on the radius and size of the lens. For small lenses having a long radius of curvature, a convex or flat abrading surface may be employed. For larger lenses having short radius of curvature, a concave abrading surface will be found more desirable. The abrading or polishing is carried out by covering the flat polishing disk (5 FIG. 1) with a soft foam material (6 FIG. 1) which may be rubber or synthetic foam. A fabric covering may be employed to accelerate the polishing action. The lens (1 FIG. 1) is then installed in the machine. A taper may be provided to align and hold the lens in place. The lens is inclined to the flat disk at the required angle to place a point (7 FIG. 1) 71 percent from the center to the edge in contact with the surface of the abrading disk. The lens and disk are set in motion by motor (3 and 4 FIG. 1) preferably at different speeds of surface travel. A speed of 600 inches per minute for the lens and 1,200 inches for the abrading disk have been used. Slower speeds may be used for plastic lens material such as those used for contact lenses.

The rotating flat disk (5 FIG. 1) is moved against the lens surface (1 FIG. 1) and the pressure is applied to the lens surface. The lens surface is embedded in the soft cover on the abrading disk. At the end of the polished cycle the polishing disk (6 FIG. 1) is moved away from the rotating lens surface (1 FIG. 1). The lens is removed from the polishing machine and the asphericity measured with a toposcope. The lens may be placed back on the machine and abraded further until the required asphericity is obtained and the total abrading time and angle or angles used are recorded. All future lenses requiring the same asperoidicity may now be abraded and the correct peripheral flattening may now be obtained by repeating the polishing times and angles used previously.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description or shown in the accompanying drawings shall be interpreted as illustrative and not in a limiting sense.

I claim:

1. A method for making convex aspheric lens surfaces comprising:
   rotating a spherical lens at a predetermined speed,
   rotating a generally flat polishing surface at a predetermined speed,
   orienting said lens and said polishing surface at an angular relationship to one another, and
   contacting said lens with said polishing surface in the area between the center and the edge of said lens to thereby form a convex aspheric lens having a longer radius of curvature at the periphery of said convex surface than at the center thereof.

2. The method for making convex aspheric lens surfaces defined in claim 2 and further comprising:
contacting said lens with said polishing surface to flatten the edge portion of said lens, wherein the point of greatest departure from a sphere is formed in said lens at about 71 percent of the distance from the center of said lens to the edge of said lens.

3. The method for making convex aspheric lens surfaces defined in claim 2 wherein the speed of rotation of said lens is less than the speed of rotation of said polishing surface.

4. A method of making a convex aspheric lens surface having a longer radius of curvature at the periphery than at the center thereof comprising:
rotating a firm polishing surface at a predetermined speed,
positioning a spherical lens at an angular relationship to said polishing surface,
contacting said lens with said polishing surface in the area between the center and edge of said lens such that the point of greatest departure from a sphere occurs at approximately 71 percent of the distance from the center of said lens to the edge of said lens and such that the depth of correction at said point is determined by $X = KD/R^3$, wherein:
$X$ = departure from a true sphere
$K$ = constant
$D$ = diameter of lens
$R$ = focal aperture.

5. The method of making convex aspheric lens having a longer radius of curvature at the periphery than at the center comprising:
rotating a firm polishing surface at a predetermined speed,
positioning a spherical lens at an angular relationship to said polishing surface,
contacting said lens with said polishing surface in the area between the center and edge of said lens such that said area is flattened according to the following formula:
$$XY = A/4F^3 (N/N-1)(h^2Y^2 - Y^4),$$
wherein
$X$ = departure from a true sphere,
$Y$ = distance from center of lens,
$A$ = aberration coefficient,
$h$ = lens radius,
$F$ = focal length,
$N$ = refractive index of lens.

* * * * *

PO-1050
(5/69)

UNITED STATES PATENT OFFICE
CERTIFICATE OF CORRECTION

Patent No. 3,641,717            Dated February 15, 1972

Inventor(s) Charles W. Neefe

It is certified that error appears in the above-identified patent and that said Letters Patent are hereby corrected as shown below:

Col. 1, line 46, "$(N/N-1h^2y^2-y^4)$" should be -- $(N/N-1)$ $(h^2y^2-y^4)$ --.
Col. 3, line 4, "Claim 2" should be --Claim 1--;
       line 11, "Claim 2" should be --Claim 1--.

Signed and sealed this 8th day of August 1972.

(SEAL)
Attest:

EDWARD M. FLETCHER, JR.      ROBERT GOTTSCHALK
Attesting Officer               Commissioner of Patents